(12) United States Patent
Huang

(10) Patent No.: US 8,267,684 B2
(45) Date of Patent: Sep. 18, 2012

(54) MOLD WITH EJECTION MECHANISM

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 152 days.

(21) Appl. No.: 12/770,687

(22) Filed: Apr. 29, 2010

(65) Prior Publication Data

US 2010/0330223 A1 Dec. 30, 2010

(51) Int. Cl.
*B29C 45/40* (2006.01)

(52) U.S. Cl. ........ 425/444; 425/190; 425/468; 425/556; 425/DIG. 58

(58) Field of Classification Search .................. 425/190, 425/444, 468, 556, DIG. 58
See application file for complete search history.

(56) References Cited

U.S. PATENT DOCUMENTS

| | | | | |
|---|---|---|---|---|
| 3,844,703 A * | 10/1974 | Hutter | ........................... | 425/556 |
| 3,871,611 A * | 3/1975 | Taketa | ........................... | 249/102 |
| 3,900,183 A * | 8/1975 | Wallace | ........................... | 249/68 |
| 3,963,209 A * | 6/1976 | Muller | ........................... | 249/67 |
| 4,280,549 A * | 7/1981 | Gibbs | ........................... | 164/113 |
| 4,379,684 A * | 4/1983 | Katagiri et al. | ................. | 425/78 |
| 4,545,753 A * | 10/1985 | Hehl | ............................. | 425/350 |
| 4,645,446 A * | 2/1987 | Hehl | ............................. | 425/350 |
| 4,793,785 A * | 12/1988 | Osada | ........................... | 425/116 |
| 4,929,170 A * | 5/1990 | Boskovic | ....................... | 425/556 |
| 5,059,105 A * | 10/1991 | Baird | ............................ | 425/116 |
| 5,316,467 A * | 5/1994 | Starkey | ........................ | 425/438 |
| 5,511,967 A * | 4/1996 | Berdan | ......................... | 425/533 |
| 5,718,930 A * | 2/1998 | Stengel | ........................ | 425/556 |
| 6,872,069 B2 * | 3/2005 | Starkey | ........................ | 425/556 |
| 7,140,868 B1 * | 11/2006 | Steele et al. | ................. | 425/438 |
| 7,153,126 B2 * | 12/2006 | Takao | ........................... | 425/444 |
| 7,214,046 B2 * | 5/2007 | Gakovic | ......................... | 425/78 |
| 7,267,538 B2 * | 9/2007 | Morales-Centeno | ......... | 425/190 |
| 2004/0182806 A1 * | 9/2004 | Figueroa | ..................... | 211/105.4 |
| 2004/0241278 A1 * | 12/2004 | Morales-Centeno | ......... | 425/556 |

* cited by examiner

*Primary Examiner* — Yogendra Gupta
*Assistant Examiner* — Emmanuel S Luk
(74) *Attorney, Agent, or Firm* — Altis Law Group, Inc.

(57) ABSTRACT

A mold comprising a core plate receiving a core insert, a cavity plate receiving a cavity insert and an ejection mechanism configured to eject the core insert is disclosed. The core insert defines a first molding surface and the cavity insert defines a second molding surface cooperating with the first molding surface. The ejection mechanism comprises a top plate, a bottom plate, an ejection rod and a gasket. The ejection rod includes a first end in contact with the core insert in the core plate and an opposing second end fixed with the top plate, the bottom plate and the gasket by the fastener and the locating piece. The top plate drives the ejection rod to eject the core insert.

8 Claims, 4 Drawing Sheets

MOLD WITH EJECTION MECHANISM

BACKGROUND

1. Technical Field

The present disclosure relates to a mold that can prevent the core insert off axis when being ejected.

2. Description of Related Art

Referring to FIG. 1, a mold 40 in related art includes a core insert 41, a cavity plate 42 and an ejection mechanism 30 to eject the core insert 41. The ejection mechanism 30 includes a top plate 31, a bottom plate 32, an ejection rod 33, a gasket 34, and a fastener 35. The top plate 31 defines a first fastening hole 310 open to the bottom plate 32. The bottom plate 32 defines a first through hole 320. The ejection rod 33 includes two ends, wherein one end is received in the first through hole 320 and defines a second fastening hole 330 aligning with the first fastening hole 310, and another end contacts the core insert 41. The gasket 34 is disposed between the top plate 31 and the bottom plate 32 and defines a second through hole 340 communicating with the first fastening hole 310 and the first through hole 320. The fastener 35 screws into the first fastening hole 310 and the second fastening hole 330 through the second through hole 340 to fasten the top plate 31 and the bottom plate 32.

The core insert 41 defines a first molding surface 410 and the cavity plate 42 defines a second molding surface 420 aligned opposite to the first molding surface 410. While in use, the top plate 31 drives the ejection rod 33 to eject the core insert 40. Typically after long time use, the ejection rod 33 and the core insert 41 goes off axis and the first molding surface 410 deflects to the second molding surface 420. Thus, the quality of the molding products between the two molding surfaces becomes unacceptable.

Therefore, what is needed is a mold to overcome the shortcoming described above.

DETAILED DESCRIPTION

Figure 1:
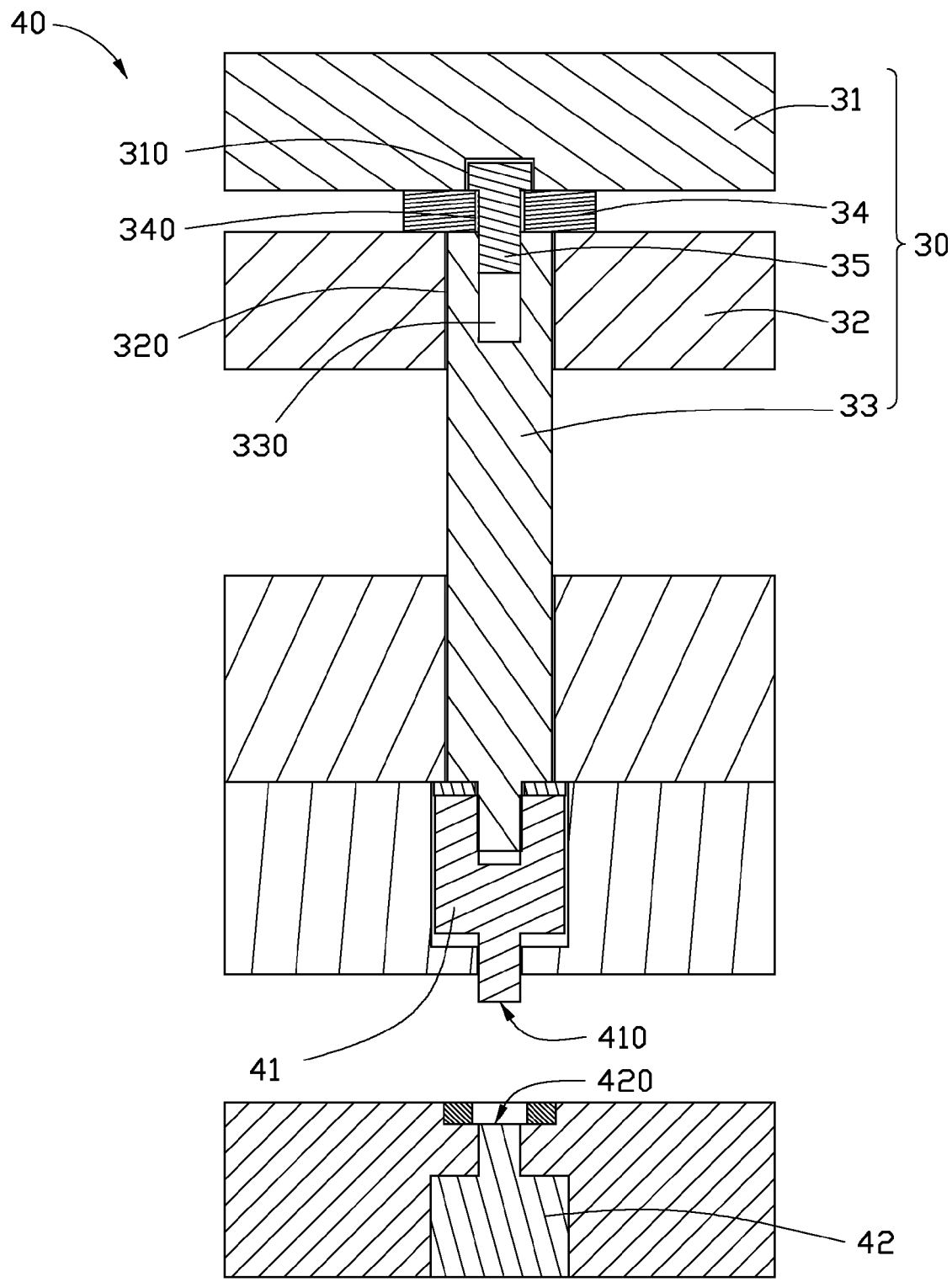
FIG. 1 is cross-sectional view of a conventional mold.
Figure 2:
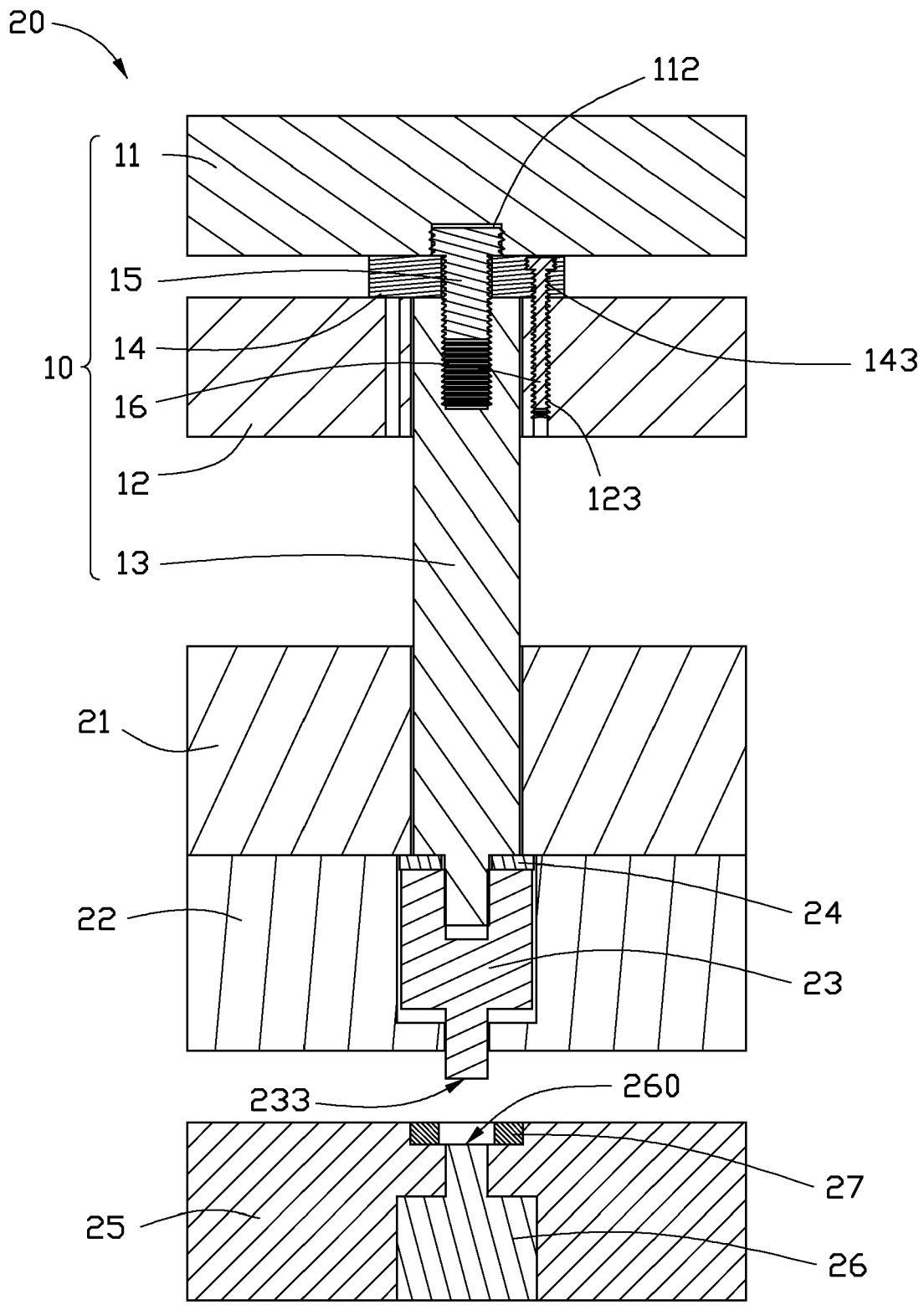
FIG. 2 is a cross-sectional view of a mold in accordance with an exemplary embodiment.

Referring to FIG. 2, a mold 20 according to an exemplary embodiment is disclosed. The mold 20 includes an ejection mechanism 10, a support plate 21, a core plate 22 receiving a core insert 23 and a core cushion 24, and a cavity plate 25 receiving a cavity insert 26 and a cavity cushion 27. The core insert 23 defines a first molding surface 233 and the cavity insert 26 defines a second molding surface 260 aligned opposite to the first molding surface 233. The ejection mechanism 10 is configured to eject the core insert 23, thus the solidified moldings are obtained.

The ejection mechanism 10 includes a top plate 11, a bottom plate 12, an ejection rod 13, a gasket 14, a fastener 15, and a locating piece 16. The ejection rod 13 includes a first end in contact with the core insert 23 in the core plate 22 and an opposing second end fixed with the top plate 11, the bottom plate 12 and the gasket 14 by the fastener 15 and the locating piece 16. The top plate 11 drives the ejection rod 13 to eject the core insert 23.

Figure 3:
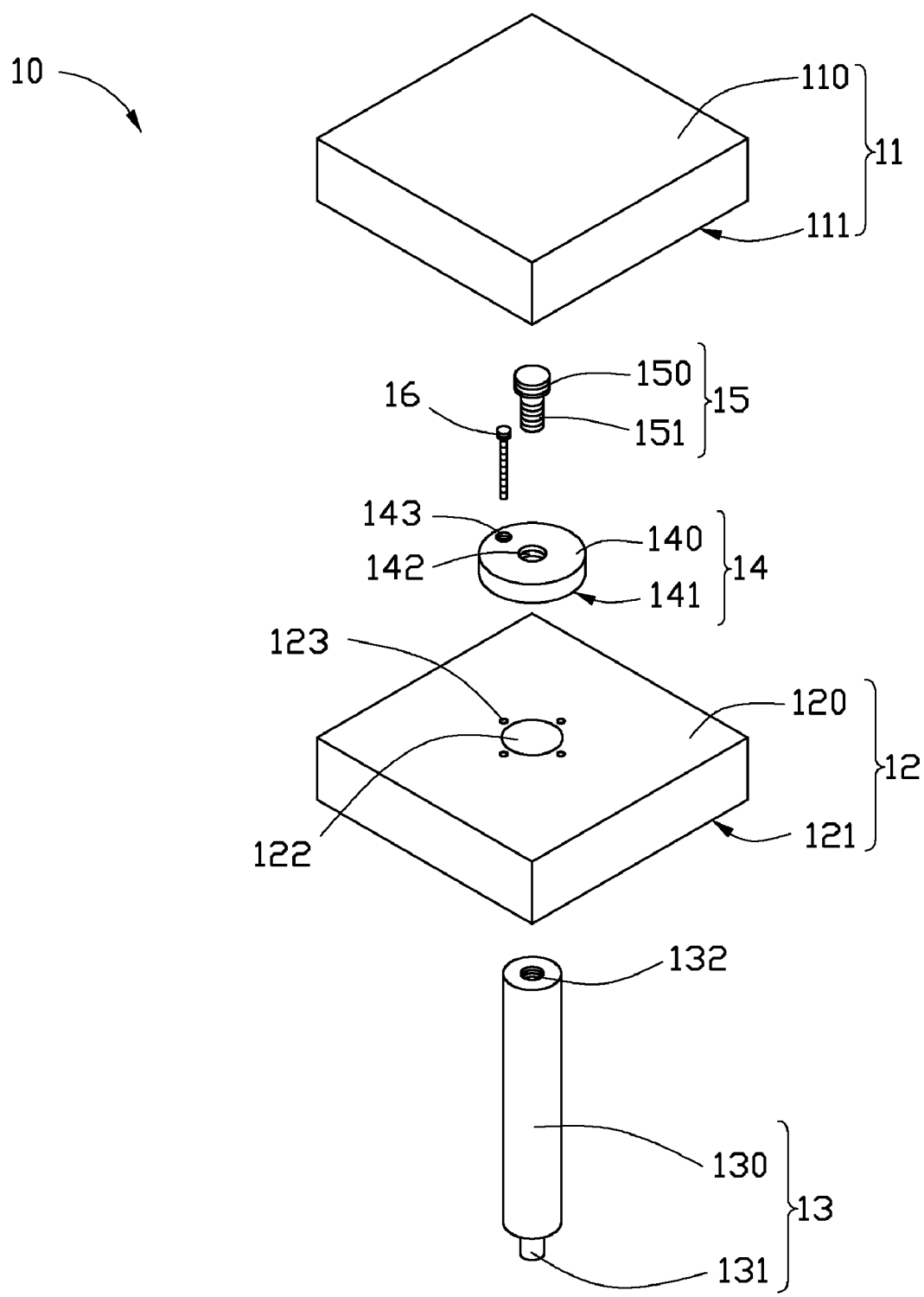
FIG. 3 is an isometric view of the mold of FIG. 1, showing an ejection mechanism of the mold.

Referring to FIG. 3 together, the top plate 11 is a rectangular board including a first surface 110 and a second surface 111 opposite to each other. The first surface 110 is away from the bottom plate 12 and the second surface 111 faces the bottom plate 12. The second surface 111 defines a first fastening hole 112 therein. In the exemplary embodiment, the first fastening hole 112 is a threaded blind hole.

The bottom plate 12, shaped like the top plate 11, includes a third surface 120 and a fourth surface 121 opposite to each other. The third surface 120 faces to the top plate 11 and the fourth surface 121 away from the top plate 11. Through the third surface 120 and the forth surface 121 the bottom plate 12 defines a first through hole 122 and four first locating holes 123 distributing symmetrically around the first through hole 122. The first locating hole 123 is a threaded hole. The distance between center lines of each locating hole 123 and the first through hole 122 are equivalent.

The ejection rod 13 includes a main rod 130 and an ejection head 131 connecting with each other. The main rod 130 and the ejection head 131 are both cylinder-shaped and the diameter of the former is greater than that of the later. The end of the main rod 130 away from the ejection head 131 is received in the first through hole 122 and defines a second fastening hole 132 aligning with the first fastening hole 112.

The gasket 14 is disposed between the top plate 11 and the bottom plate 12. The gasket 14 includes a fifth surface 140 facing the top plate 11 and a sixth surface 141 facing the bottom plate 12. Through the fifth surface 140 and the sixth surface 141, the gasket 14 defines a third fastening hole 142 aligning with the second fastening hole 134 and a second locating hole 143 aligning with a first locating hole 123. The third fastening hole 142 and the second locating hole 143 are both threaded holes. The diameter of the third fastening hole 142 is equal to that of the second fastening hole 132.

The fastener 15 is a double head bolt that includes a first threaded head 150 and a second threaded head 151. The first threaded head 150 is screwed into the first fastening hole 112, and the second threaded head 151 is screwed into the second fastening hole 134 and the third fastening hole 142 in order. Thus, the top plate 11, the gasket 14 and the ejection rod 13 are fixed together.

The locating piece 16 is a elongated bolt screwed into the second locating hole 143 and a first locating hole 123 in order. The outer thread of the bolt 16 engages with the inner thread of the second locating hole 143 and the first locating hole 123. Thus the bottom plate 12 and the gasket 14 are fixed together.

Figure 4:
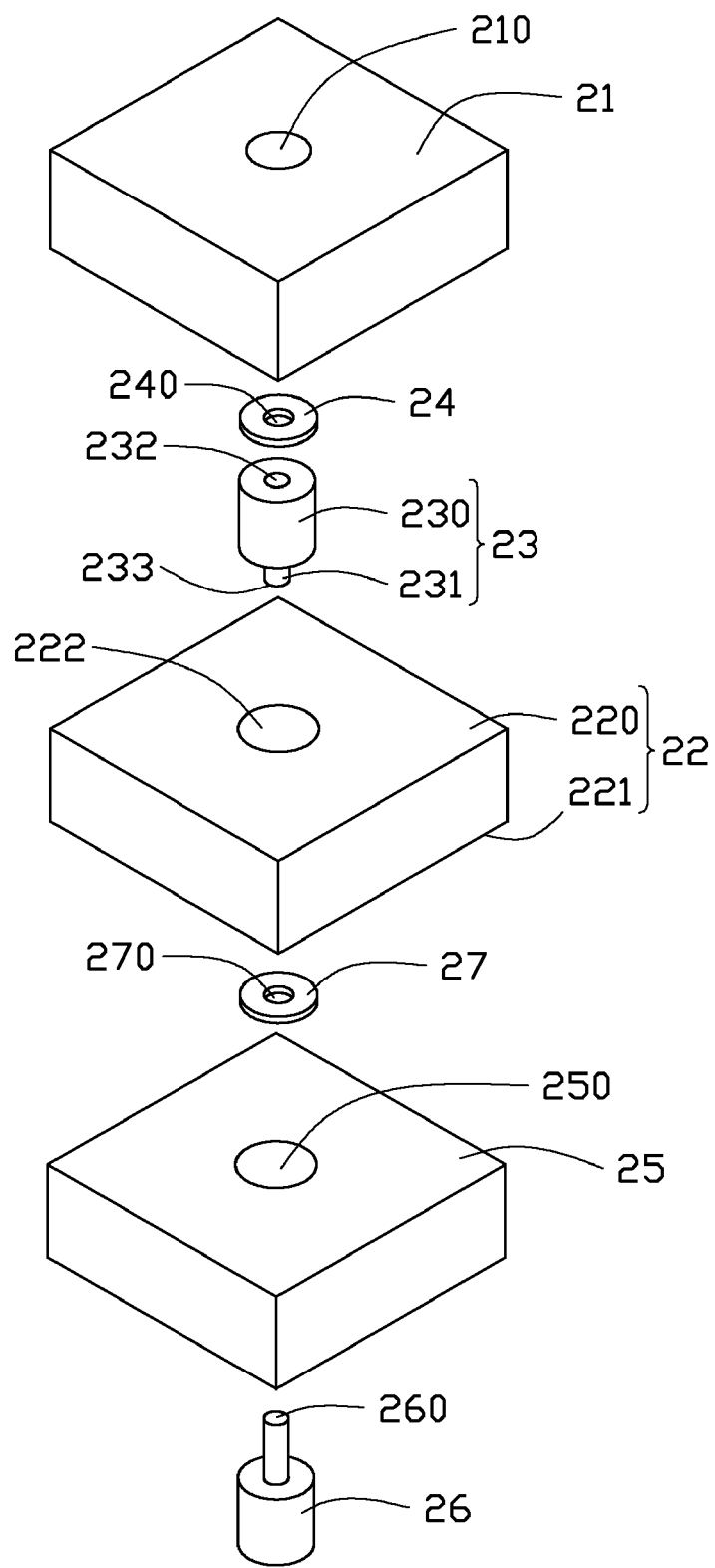
FIG. 4 is an isometric view of the mold of FIG. 1, showing another embodiment of the mold.

Referring to FIG. 2 and FIG. 4 together, the support plate 21 is disposed on the core plate 22. The support plate 21 defines a second through hole 210 aligning with the first through hole 122.

The core plate 22 includes a seventh surface 220 and an eighth surface 221 opposite to each other. The seventh surface 220 contacts the support plate 21. Through the seventh surface 220 and the eighth surface 221 the core plate 22 defines a receiving space 222 for the core insert 23. The receiving space 222 is a shoulder hole.

The core insert 23 includes an ejection portion 230 and a molding portion 231 connecting with each other, wherein the diameter of the molding portion 231 is less than that of the ejection portion 230. The ejection portion 230 defines an ejection hole 232 and the molding portion 231 defines a first molding surface 233. The core insert 23 is received in the receiving space 222, and the molding portion 231 may stick out of the core plate 22.

The core cushion 24 is disposed between the core insert 23 and the support plate 21. The core cushion 24 defines a third through hole 240 aligning with the ejection hole 232. The ejection rod 13 extends through the second through hole 210 and the third through hole 240 in order, and the ejection head 131 engages the ejection hole 232. The ejection rod 13 may drive the core insert 24 and the core insert 23 to move and the molding portion 231 may stick further out of the core plate 22. The support plate 22 disposed on the core plate 22 may prevent the core insert 23 and the core cushion 24 from disengaging from the core plate 22.

The cavity insert 26, shaped like the core insert 23, defines a second molding surface 260 cooperating with the first molding surface 233. The cavity cushion 27, shaped like the core cushion 240, defines a forth through hole 270. And the cavity plate 25, shaped like the core plate 22, defines a second receiving space 250 for the cavity insert 26 and the cavity cushion 27.

While in use, the top plate 11 drives the ejection rod 13 to eject the core cushion 24 and the core insert 23. By the fastener 15 and the locating piece 16 fixing the bottom plate 12, the ejection rod 13 together, the ejection rod 13 may not go off axis in the first through hole 122 after long time use. Thus the first molding surface 233 of the core insert 23 cooperate well with the second molding surface 260 of the cavity insert 26.

However, a tiny difference exists because of the engagement tolerance of the locating piece 16 screwing into different first locating holes 123 of the bottom plate that makes the first molding surface 233 cooperate slightly distinct with the second molding surface 260. While the mold 20 is in use, it is possible to choose the best cooperation for better moldings.

In another embodiment, the number of the first locating holes 123 may be greater or less than four and the first locating holes 123 may not distribute equidistantly around the first through hole 122. The locating piece 16 screwing into different locating holes 123 may obtain different cooperation of the first molding surface 233 and the second molding surface 260.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A mold comprising:
   a core insert;
   a core plate receiving the core insert;
   a cavity insert;
   a cavity plate receiving the cavity insert, the cavity insert and the core insert cooperatively defining a molding cavity;
   an ejection mechanism configured to eject the core insert, comprising:
   a top plate comprising a first fastening hole;
   a bottom plate comprising a first through hole aligned with the first fastening hole and at least two first locating holes parallel with the first through hole;
   an ejection rod having a first end received in the first through hole, and an opposing second end contacting the core insert, wherein the first end defining a second fastening hole open to the first fastening hole;
   a gasket disposed between the top plate and the bottom plate, wherein the gasket defines a third fastening hole aligned with the first fastening hole, and a second locating hole aligned with one of the at least two first locating holes;
   a fastener screwed into the first fastening hole, the third fastening hole and the second fastening hole; and
   an elongated locating piece screwed into one of the at least two first locating holes and the second locating hole for tilting the ejection rod because of different engagement tolerance between the locating piece and different first locating holes, thereby choosing the best cooperation between the core insert and the cavity insert for better moldings.

2. The mold as described in claim 1, further comprising a support plate disposed between the bottom plate and the core plate, wherein the support plate contacts the core plate and defines a second through hole for extension of the ejection rod therethrough.

3. The mold as described in claim 1, wherein the ejection rod comprises an ejection head and a main rod having two ends respectively received in the first through hole and the second through hole.

4. The mold as described in claim 3, wherein the core insert comprises a molding portion and an ejection portion with an ejection hole engaged with the ejection head.

5. The mold as described in claim 4, further comprising a core cushion disposed between the main rod and the ejection portion of the core insert, wherein the core cushion defines a third through hole for extension of the ejection head therethrough.

6. The mold as described in claim 1, wherein the number of the at least two first locating holes is four and the four first locating holes are arranged equidistantly around the first through hole.

7. The mold as described in claim 1, wherein the third fastening hole, the at least two first locating holes and the second locating hole are through holes.

8. The mold as described in claim 7, wherein the diameter of the first fastening hole is greater than that of the second fastening hole, the diameter of the second fastening hole is equal to that of the third fastening hole, and the fastener comprises a first threaded portion screwed into the first fastening hole and a second threaded portion screwed into the second fastening hole and the third fastening hole.

* * * * *